Patented Dec. 19, 1950

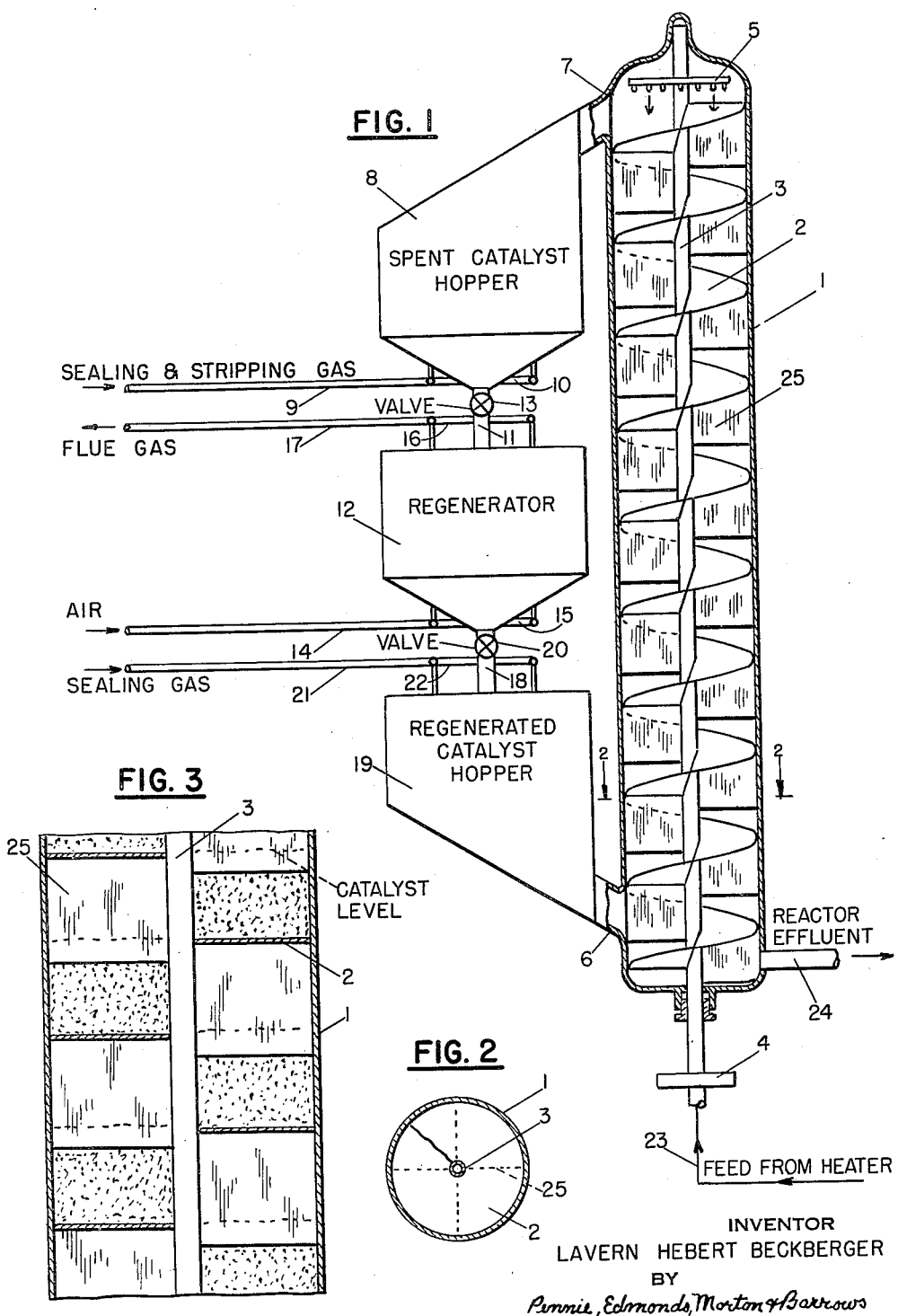

2,534,752

UNITED STATES PATENT OFFICE 2,534,752

PROCESS FOR THE CATALYTIC CONVERSION OF HYDROCARBONS

La Vern Herbert Beckberger, East Chicago, Ind., assignor to Sinclair Refining Company, New York, N. Y., a corporation of Maine Application June 21, 1947, Serial No. 756,285

4 Claims. (Cl. 196—52)

This invention relates to the pyrolytic conversion of hydrocarbons and, more particularly, to pyrolytic conversion processes involving the use of a bed of a solid catalyst.

In such operations, the conversion of the hydrocarbons is effected by passing the hydrocarbons, usually in vapor phase, in intimate contact with the bed of catalyst at an elevated temperature. During the conversion, carbonaceous material is deposited on the catalyst, resulting in a loss of catalytic effectiveness and this carbonaceous deposit must be periodically removed from the catalyst, as by burning by contact with air, to restore its catalytic effectiveness.

In one method of operation previously proposed, the hydrocarbons to be converted are passed continuously upwardly through a downwardly gravitating bed of catalyst in granular or pelleted form, in a vertically elongated conversion chamber of large transverse dimensions, the catalyst being continuously withdrawn from the lower end of the chamber, regenerated and returned to the upper end of the chamber. The regeneration is effected by burning off the carbonaceous deposit, by passing the hot catalyst downwardly through a somewhat similar vertically elongated chamber, countercurrent to a stream of air.

Such operations have entailed expensive and troublesome mechanical elevator means for conveying the catalyst from the lower end of the conversion chamber to the top of the regenerating chamber and, again, from the lower end of the regenerating chamber to the top of the conversion chamber.

Difficulties have also been experienced in effecting uniform contact between the hydrocarbon vapors and the catalyst by reason of the tendency of the vapors to channel upwardly through the bed of catalyst.

A further serious difficulty in operations of the type described has been the uneven movement of the catalyst through the conversion chamber which has resulted in the hammering, or serious vibration of the chamber. Operations of the type described are subject to the further objection that a conversion chamber of great height is required which adds greatly to the cost of necessary apparatus and further aggravates elevator problems and costs.

In my copending application Ser. No. 756,284 filed concurrently herewith, I have described and claimed improved method and means of effecting the contact between the hydrocarbon vapors to be converted and the catalyst, according to which the catalyst is conveyed upwardly through the conversion chamber along a continuous spiral path, as by means of a screw conveyor, and the hydrocarbon vapors are passed in a spiral path through the spiral body of catalyst. The invention there described provides a materially increased length of the path of the hydrocarbon vapors through the catalyst in a conversion chamber of a given height or makes it possible materially to decrease the height of the conversion chamber without shortening the path of the hydrocarbon vapors through the catalyst bed.

The present invention provides a further improvement in processes of the type described whereby the problem of elevating the catalyst is further materially simplified.

According to my present invention, the sole conveyor necessary for elevating the catalyst is that which carries the catalyst upwardly through the conversion chamber and serves not only as a conveyor, but also has the function of effecting a more thorough and extended contact between the hydrocarbon vapors and the catalyst and is free from the previously noted vibration.

The catalyst is, with advantage, conveyed upwardly through the reaction chamber by means of a helical screw conveyor and passes by gravity from the upper end of the chamber into a spent catalyst hopper which also serves as a stripping zone for stripping readily vaporizable hydrocarbons from the catalyst by contact with a gaseous stripping medium. From this elevated stripping zone, the catalyst gravitates downwardly through an elevated regenerating zone, positioned below the hopper, wherein the catalyst is regenerated by contact with air and, from thence, gravitates downwardly into an elevated regenerated catalyst hopper positioned below the regenerator and from which the catalyst is returned by gravity to the lower end of the reaction chamber. The regenerator and the two hoppers are all positioned at an elevation intermediate the lower and upper ends of the reactor.

The invention will be more fully described and illustrated with reference to the accompanying drawings which represent conventionally and somewhat diagrammatically an advantageous embodiment of my invention, of which—

Figure 1 is a vertical sectional view;

Figure 2 is a horizontal sectional view of the reaction chamber along the lines 2—2 of Figure 1; and Figure 3 is a fragmentary vertical sectional view of the reaction chamber, somewhat enlarged, showing the internal arrangement of the chamber in somewhat greater detail.

The apparatus indicated by the reference numeral 1 of Figure 1, is a vertically elongated cylindrical reaction chamber, closed at its upper and lower ends and provided interiorly with a helix 2, supported by shaft 3, which is driven by any suitable means not shown in the drawing, through a gear or pulley 4.

In the apparatus shown, the shaft 3 is hollow and is connected at its lower end by known means with the source of the hydrocarbons to be converted, the upper end of shaft 3 is closed, but the shaft is in open communication near its upper end, a vapor distributor or rosette 5 adapted to the even distribution of the hydrocarbon vapors throughout the cross-sectional area of the reaction chamber.

In operation, freshly regenerated catalyst is passed by gravity into the lower end of the reaction chamber through conduit 6, is caught up by the screw conveyor and carried upwardly as a helical body through the conversion chamber and passes by gravity from the upper end thereof through conduit 7 into the spent catalyst hopper 8.

A gaseous stripping and sealing medium, steam, for instance, is injected into the lower end of the hopper 8 through line 9 and manifold 10, adapted to distribute the stripping medium uniformly throughout the cross-sectional area of the hopper. The stripping medium and the hydrocarbons stripped from the catalyst, pass from the upper end of the hopper through conduit 7 into the upper end of the conversion chamber.

The stripped catalyst passes by gravity from the lower end of the hopper through conduit 11 into the upper end of the regenerator 12 at a rate controlled by valve 13, of known type, for instance, a conventional slide valve, and passes downwardly through the regenerator countercurrent to a stream of air passed into the lower end of the regenerator through line 14 by way of manifold 15. The catalyst is thus regenerated by contact with the air and the resultant products of combustion, or flue gases, pass from the upper end of the regenerator, through manifold connections 16 and line 17 to a precipitator, or stack, not shown.

The regenerated catalyst flows from the lower end of the regenerator, through conduit 18 into the regenerated catalyst hopper 19 at a rate controlled by valve 20, of conventional type. From the hopper 19, the catalyst flows by gravity through conduit 6 into the lower end of the conversion chamber, as previously described, and is recycled to the system.

A sealing gas, steam, for instance, is injected into the upper end of the regenerated catalyst hopper through line 21 by way of manifold 22 for the purpose of creating a zone of higher pressure in the hopper and sealing the conduit 18 against the downward passage of air from the regenerator and sealing conduit 6 against the passage of hydrocarbon vapors therethrough into the hopper.

A hydrocarbon feed stock, advantageously preheated and either in vapor phase or mixed phase, is passed into the lower end of the hollow shaft 3 through line 23 and passes upwardly through shaft 3 in heat exchange relation with the hot catalyst within the conversion chamber. From the upper end of the shaft, the hydrocarbons pass through the distributor 5 into the upper portion of the chamber and, from thence, spiral downwardly through the upwardly moving spiral bed of hot catalyst and are withdrawn from the lower end of the conversion chamber through line 24 to fractionating apparatus, not shown in the drawing.

In operation, it is desirable to introduce the stripping and sealing gaseous medium into the lower portion of hopper 8 under pressure sufficient to maintain the upward flow of the stripping medium and stripped hydrocarbons through conduit 7 into the upper portion of the conversion chamber against the pressure of the hydrocarbon vapors in the reactor.

In order to avoid the channelling of the hydrocarbon vapors along the upper surface of the flights without adequate contact with the catalyst, I provide fins 25 projecting downwardly from the upper surface of the flights to a depth below the upper surface of the catalyst bed on the next lower flight. Advantageously, these fins are spaced along the undersurface of the flights at angles of about 90° and extend radially, as more clearly shown in Figure 2 of the drawings, although the invention contemplates the use of fins at greater or lesser angles and also the absence of fins where the catalyst is fed to the reactor at a rate such that the spaces between the flights are completely filled with the catalyst.

The invention is applicable to processes in which the catalyst is used, either in finely divided, coarse-grained, beaded or pelleted or microspherical form. It provides a method and means of operation whereby the feed of the catalyst is independent of the feed of hydrocarbon vapors.

Further, by passing the hydrocarbon to be converted through the hollow shaft of the conveyor, the charge oil is preheated by heat absorbed from the catalyst, the helix and fins serving to increase the heat absorbing surface of the hollow shaft and permitting heat exchange between the incoming oil and the catalyst.

By reason of this feature of the invention, the process is used, with particular advantage, in carrying out exothermic hydrocarbon reactions, the incoming charge oil being preheated by heat liberated by the reaction. In such operations, feed oil may, with advantage, be fed to the process in liquid or mixed phase and the charge vaporized by heat absorbed from the reaction zone. In carrying on endothermic reactions, the charge oil may, with advantage, be preheated to a temperature in excess of the desired reaction temperature and a portion of the preheat transmitted to the catalyst in the reaction zone, whereby temperature conditions are more nearly equalized.

The invention has the further advantage of avoiding indiscriminate mixing of spent or partially spent catalyst with freshly regenerated catalyst whereby catalytic effectiveness and catalyst life are improved.

As previously noted, the invention is applicable to various types of conversion reactions and contemplates the use of catalysts known to be effective in the carrying out of the particular operation. Operating conditions are likewise subject to considerable variation, depending upon the particular catalyst employed, the nature and extent of the desired reaction and the characteristics of the feed stock.

In cracking gas oil, for instance, using an alumina-silica type catalyst, the temperature in the reaction zone is, with advantage, maintained within the range of about 750° to 950° F. and the pressure within the range of about 5 to 25 pounds per square inch. In the regenerating zone, temperatures within the range of 900° to 1,150° F., for instance, are usually satisfactory.

In effecting dehydrogenation of butane, for instance, the catalyst may be a chromium oxide on an alumina carrier, the reaction temperature may be within the range of 900° to 1,150° F. and the pressure about 0.1 to 5 atmospheres absolute.

In the amination of low boiling olefins, the reaction temperature may be maintained within the range of 640° to 780° F., advantageously about 700° F., and the pressure within the range of 250 to 1,500 pounds per square inch, advantageously around 500 pounds per square inch. The catalyst may be reduced cobalt oxide, reduced iron oxide, or other known amination catalysts. The ammonium may be introduced with the olefin feed stock, the molar ratio of olefin to ammonia being, with advantage, within the range of 10:1 to 2.5:1. In amination operations of this type, feed stock may be used which contains, say, from 10 to 40% olefins. The space velocity of the feed stock, based on liquid volume of the feed, per volume of catalyst may, with advantage, be within the range of .3 to 2.

The mixing of regenerating air, or products of combustion, with the hydrocarbon vapors is generally to be avoided and is readily prevented, in accordance with my present invention by maintaining pressures in the regenerator and the upper and lower hoppers properly balanced with respect to each other and with respect to the pressure in the reaction chamber, as will be understood by the art in the light of the foregoing disclosure.

I claim:

1. In a process for the pyrolytic conversion of hydrocarbons wherein the hydrocarbons in vapor phase are passed through a body of catalyst at conversion temperature in a vertically elongated reaction chamber, spent catalyst is continuously withdrawn from one end of the body of catalyst, regenerated and returned to the other end of the body of catalyst, the improvement which comprises passing the catalyst as a continuous body upwardly through the vertically elongated reaction chamber along a spiral path, passing the hydrocarbons to be converted upwardly through a conduit in heat exchange relation but out of contact with the spiral catalyst body to the upper end of the chamber and, from thence, downwardly along the spiral path through the ascending spiral body of catalyst.

2. In a process for the pyrolytic conversion of hydrocarbons wherein the hydrocarbons in vapor phase are passed through a body of catalyst at conversion temperature in a vertically elongated reaction chamber, spent catalyst is continuously withdrawn from one end of the body of catalyst, regenerated and returned to the other end of the body of catalyst, the improvement which comprises passing the catalyst as a continuous body upwardly through the vertically elongated reaction chamber along a spiral path, passing the hydrocarbons to be converted upwardly through a conduit in heat exchange relation but out of contact with the spiral catalyst body to the upper end of the chamber and, from thence, downwardly along the spiral path through the ascending spiral body of catalyst, passing the catalyst by gravity from the upper end of the reaction chamber to and through a regenerating zone, positioned at an elevation intermediate the upper and lower end of the reaction chamber, regenerating the catalyst in a regenerating zone by contact with air and returning the regenerated catalyst by gravity to the lower end of the reaction chamber.

3. In a process for the pyrolytic conversion of hydrocarbons wherein the hydrocarbons in vapor phase are passed through a body of catalyst at conversion temperature in a vertically elongated reaction chamber, spent catalyst is continuously withdrawn from one end of the body of catalyst, regenerated and returned to the other end of the body of catalyst, the improvement which comprises passing the catalyst as a continuous body upwardly through the vertically elongated reaction chamber along a spiral path, passing the hydrocarbons to be converted upwardly through a conduit in heat exchange relation but out of contact with the spiral catalyst body to the upper end of the chamber and, from thence, downwardly along the spiral path through the ascending spiral body of catalyst, passing the catalyst by gravity from the upper end of the reaction chamber to a stripping zone and stripping the catalyst therein by contact with a gaseous stripping medium, passing the catalyst by gravity from the stripping zone to a regenerating zone positioned beneath the stripping zone and regenerating the catalyst therein by contact with air, the stripping zone and the regenerating zone being positioned at an elevation intermediate the upper and lower ends of the reaction chamber, and passing the regenerated catalyst by gravity from the regenerating zone to the lower end of the reaction chamber.

4. In a process for the pyrolytic conversion of hydrocarbons wherein the hydrocarbons in vapor phase are passed through a body of catalyst at conversion temperature in a vertically elongated reaction chamber, spent catalyst is continuously withdrawn from one end of the body of catalyst, regenerated and returned to the other end of the body of catalyst, the improvement which comprises passing the catalyst as a continuous body upwardly through the vertically elongated reaction chamber along a spiral path, passing the hydrocarbons to be converted upwardly through a conduit in heat exchange relation but out of contact with the spiral catalyst body to the upper end of the chamber and, from thence, downwardly along the spiral path through the ascending spiral body of catalyst, passing the catalyst by gravity from the upper end of the reaction chamber to a stripping zone and stripping the catalyst therein by contact with a gaseous stripping medium, passing the catalyst by gravity from the stripping zone to a regenerating zone positioned beneath the stripping zone and regenerating the catalyst therein by contact with air, and passing the regenerated catalyst by gravity from the regenerating zone to a third enclosed zone positioned beneath the regenerating zone, the stripping zone, the regenerating zone and the third zone being positioned at elevations intermediate the upper and lower ends of the reaction chamber, passing the catalyst by gravity from the third chamber into the lower end of the reaction chamber, and preventing intermixing of air and flue gases from the regenerating zone with hydrocarbon vapors by forming a gas seal at the entrance and exit ends, respectively, of the regenerating zone.

LA VERN HERBERT BECKBERGER.

REFERENCES CITED

The following references are of record in the file of this patent:

UNITED STATES PATENTS

| Number | Name | Date |
| --- | --- | --- |
| 2,265,837 | Harding | Dec. 9, 1941 |
| 2,348,699 | Tuttle | May 9, 1944 |
| 2,370,816 | Schonberg | Mar. 6, 1945 |
| 2,374,151 | Wolk et al. | Apr. 17, 1945 |
| 2,418,679 | Utterback | Apr. 8, 1947 |
| 2,419,097 | Stratford et al. | Apr. 15, 1947 |